Figure 1:
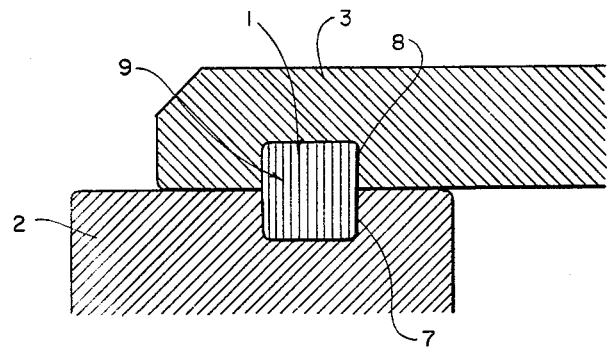

May 3, 1960 A. C. SCHMIDT 2,935,345
INTERNAL RETAINING RING

Filed Oct. 22, 1956 3 Sheets-Sheet 1

Alfred C. Schmidt
INVENTOR.

BY

May 3, 1960   A. C. SCHMIDT   2,935,345
INTERNAL RETAINING RING
Filed Oct. 22, 1956   3 Sheets-Sheet 3

Alfred C. Schmidt
INVENTOR.

BY

United States Patent Office 2,935,345
Patented May 3, 1960

2,935,345

INTERNAL RETAINING RING

Alfred C. Schmidt, San Carlos, Calif.

Application October 22, 1956, Serial No. 617,670

1 Claim. (Cl. 287—52.05)

(Granted under Title 35, U.S. Code (1952), sec. 266)

The invention described herein may be manufactured and used by or for the Government of the United States of America for governmental purposes without the payment of any royalties thereon or therefor.

The present invention relates to coupling means and, more particularly, to so-called retaining rings, such as commonly are used for coupling or keying-together concentrically-arranged cylindrical parts.

Such retaining rings frequently are employed in preference to the more conventional threaded or pinned interconnections because of their great strength, small size, economy, and convenience. Also, in addition to preventing any axial separation of the parts, they permit the parts to rotate relative one to another for alignment purposes. In actual practice, various ring types, such as the snap-on external and internal type, the two-piece rings and the concealed feed-in type with which the present invention is most directly concerned may be employed. Generally, these feed-in rings are to be preferred over other types of retaining rings where it is desired to use only one ring to prevent axial movement in two directions, where it is desired to fasten a cylindrical member in a blind hole, or where it is desired to have a concealed fastener. However, as will become apparent, the principles of the invention extend beyond any particular variety of presently-available rings.

As to the construction of these retaining rings of the feed-in type, they customarily have been formed of an elongate strip of metal dimensioned for close reception in a path usually provided by circumferentially grooving the mating surfaces of the cylindrical parts to be interconnected. Also, to facilitate insertion of the ring into this path, the inner groove usually is provided with a notched-out portion, while the ring itself carries at one of its ends an offset tip or hook adapted to be engaged in this notch or hole. To make the interconnection, the tip is inserted through a slot in the outer part and anchored in the notch in the inner part, which then is relatively rotated to wind the ring fully into the path.

After the connection has been made to the extent that the ring has been fully wound into the path, the security of the connection so far as preventing axial separation is entirely satisfactory. However, certain difficulties are encountered both during the insertion of the ring into the path and during its extratcion. One such difficulty is found in frequent bending and breakage at the hooked tip portion during insertion and removal from the engagement notch and the main reason for this trouble is that the hooked tip usually is made to fit snugly into the notch so that any up or down motion of the body of the ring during insertion or removal subjects it to bending forces. As will be seen later, this bending is especially likely to occur during removal if the two cylindrical members are relatively rotated beyond the proper removal point. On the other hand, when care is exercised to avoid such bending, the operation of inserting or removing the tip is troublesome because the tip must be inserted at just the right angle. Still another type of difficulty occurs if the hooked tip is not strong enough, and breaks off while the ring is being wound or unwound from the path. Various attempts to obviate these difficulties have resulted in some ingenious designs which have only partly solved the problems.

It is, therefore, an object of the present invention to provide a retaining ring in which the possibilities of tip bending and breakage are reduced to a minimum.

A related object is to provide a retaining ring capable of being inserted into or removed from its engagement notch from any convenient angle without incurring such bending forces as produce breakage.

Among a number of other objects which later will become apparent, are the provisions of a retaining ring which tends to conform to the grooved path of its coupling members, which permits relative rotation of the coupling members without accidental release of the ring, and which permits smooth relative rotational movement of the coupled members.

According to the invention, the retaining ring is provided at one end with an offset tip adapted to be closely received in the engagement notch. However, although the tip is closely receivable in the notch, certain of its corners nevertheless are rounded or, in other words, provided with radii of curvature of such a degree as to permit the tip to rock on the base of the notch and thereby permit the elongate body portion of the tip to swing through a relatively wide angle without imposing bending forces on its neck portion. Preferably, as will be developed more fully, the leading and trailing side walls of the tip are formed with flat or straight surfaces which, when the body portion of the ring is wound into its path, fit tightly against the side walls of the notch so as to firmly and frictionally hold the tip in the notch. Another desirable adjunct of the preferred form of the invention is the provision at the trailing end of the ring of a beveled portion adapted in a manner which will become apparent to prevent accidental release of the ring. The invention further contemplates several other features which can be more readily understood in the detailed descriptive portion of the specification.

Figure 2:
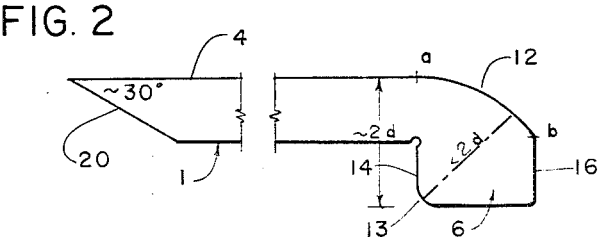
Figure 3:
Figure 4:
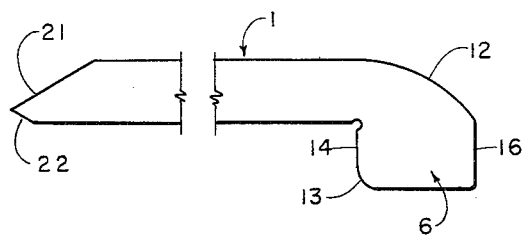
Figure 5:
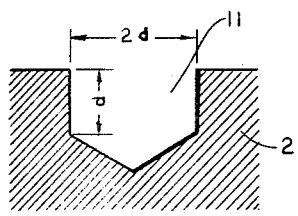
Figure 6:
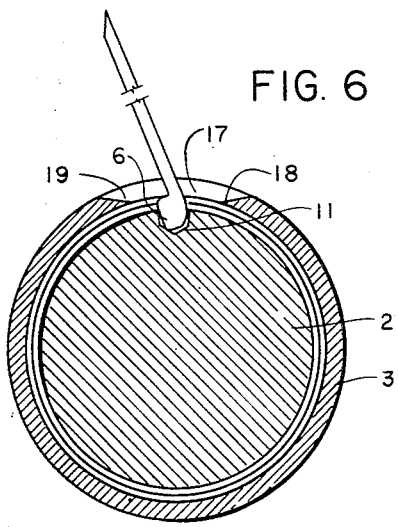

The preferred embodiments of the invention are illustrated in the accompanying drawings of which Fig. 1 is a sectional view illustrating the manner in which the present internal retaining ring is used to axially secure together two cylindrical members; Figs. 2 and 3 side and end views respectively of the ring itself; Fig. 4 a side view similar to Fig. 2 of a modified form; Fig. 5 a sectional view of the hook-receiving notch; Figs. 6, 7, 8 and 9 transverse sections illustrating various positions assumed by the ring during its insertion into and removal from the recipient grooves of the cylindrical members; and Figs. 10 and 11 views similar to Figs. 6 and 9 illustrating the manner in which the two modifications differ in function.

Referring to the drawings, the internal retaining ring of the invention, generally designated by the numeral 1, is illustrated as coupling together two concentrically-arranged cylindrical members, such as members 2 and 3 which, among many other possibilities, can be considered as a cylinder head 2 disposed concentrically within a cylinder tube or sleeve 3. As may be noted in Fig. 2, the ring is formed of an elongate body portion 4 provided with a rectilinear tip portion or hook detent 6 that, in a manner to be described, facilitates insertion of the ring. By way of orientation, it further should be noted that cylindrical members 2 and 3 each are provided with annular grooves 7 and 8 (Fig. 1) adapted, when aligned one with the other, to form a path 9 into which the ring can be wound to lock together the two members. To facilitate the winding of the ring into this path, one of the cylindrical members, such as member 2, has a notch 11 formed for closely receiving ring tip or hook 6. The coupling together of the two cylindrical members then is accomplished first by engaging hook 6 in notch 11 and then rotating one of the members relative to the other to draw the body portion into path 9.

It already has been stated that the present improvements are mostly concerned with the minimizing of tip breakage and the ease of inserting and receiving the ring from its path. As to the tip breakage, this long has been a recognized problem and a number of expedients have been attempted. The difficulty primarily is due to the fact that the tip or hook portion must be rather tightly received in its corresponding notch so that, when it is desired to remove the ring, relative rotation of the cylindrical member frequently causes one of the members to bear against the neck portion of the hook. Unless sufficient care is exercised, application of slightly excessive pressures are sufficient to bend the tip and eventually break it.

The problem involved in inserting the hook into its notch also arises from the fact that the hook portion must be tightly received in the notch. Thus, as can be readily visualized, a hook portion projecting outwardly at right angles to the body portion normally would be insertable into the notch only when the hook is pointed parallel to the side walls of the notch.

Both of these difficulties are eliminated in the present invention by shaping the hook in a particular manner. Generally considered, the hook is formed with certain of its edges rounded or, in other words, provided with radii of curvature which, as will be explained, permit the hook to rock over an approximate 90° angle when it is engaged in the notch. This rocking, in turn, substantially eliminates the application of bending forces on the neck of the hook and thereby materially minimizes breakage. As may be seen in Fig. 2, two diametrically opposed edges 12 and 13 are so rounded and, for purposes of identification, it may be considered that edge 12 is the outermost or leading upper edge of body portion 4 while edge 13 is the inner or trailing bottom edge of the hook which is diametrically opposite to upper leading edge 12 of the body portion. Otherwise, the hook end of the ring is substantially rectilinear in shape, although it is important to note that side wall 14, which extends upwardly from edge 13, and sidewall 16, which extends downwardly from edge 12, both are straight walls.

The degree of curvature of edges 12 and 13 also is a matter of some concern since the curvature should be sufficient not only to permit the rocking motion but also to permit the hook to be inserted into its notch 11 from a wide range of directions. At the same time, straight sides 14 and 16 must be long enough to securely engage the sides of the notch during winding and unwinding and the distance between them must be great enough to nearly fill the length of the notch. Another factor of importance is the depth of the notch which must be deep enough to accommodate the hook and yet shallow enough to permit the hook and body of the ring to rock over a wide angle. This shallowness, incidently, is a great advantage in applications where it is desirable to not penetrate into an inner cavity.

Referring to Figs. 2 and 5, if the height of the body portion of the ring is "$d$" inches, the hook is usually given a height $d$ also, making the overall height of body and hook $2d$. The length of the hook is then made approximately $1\frac{7}{8}d$, straight side 14 approximately $\frac{2}{3}d$, and straight side 16 approximately $d$. The engagement notch is then given a depth $d$ and a length (or diameter) $2d$. The thickness of the ring, and the consequent width of the grooves cut in the cylindrical parts being joined is also typically $d$, but may be varied depending on the loads to be resisted, and the yield strengths of the materials present.

Such dimensions, of course, are purely exemplary and are submitted primarily to facilitate explanation of the degree to which edges 12 and 13 should be rounded. The important point with respect to these edges is that they should be sufficiently rounded so that the maximum diametrical distance between edges 12 and 13 or, in other words, the distance of the dot and dash line shown running between these edges in Fig. 2 is no more than $2d$. Preferably, the curvature of edge 12 is defined by such a radius as will provide a smooth curve between points $a$ and $b$. When such a curvature is used for edge 12, edge 13 then should be rounded an amount sufficient to produce a condition in which the length of the previously-mentioned dot and dash line is no more than $2d$, still keeping sides 14 and 16 as long as possible. It, of course, will be understood that this particular method of providing the edge curvatures is to be preferred only in a general way and, depending upon the materials used or the particular objects being secured, the curvatures can be generated in other manners. The essential condition is that the diametrical distance between edges 12 and 13 be no more than $2d$. The reason for this limitation will become apparent upon considering the manner in which the hook acts to minimize the breakage and facilitate insertion and removal.

The functions of the hook, and, in fact of the ring as a whole, best can be understood by progressively following an operation of inserting the hook into its notch, winding the ring into its path and subsequently removing or detaching the ring. For this purpose, Figs. 6 through 11 have been provided. Fig. 6 illustrates the initial insertion of hook 6 into its engagement hole or notch 11 and, as will be noted, the hook is inserted into notch 11 through a feed slot 17. The latter is machined into actual cylindrical member 2 so that corner portions 18 and 19 provide tangential openings into the ring path. The edges of 18 and 19 are purposely left sharp to facilitate removal of the ring, as will be discussed later. Another factor which is common to the use of all retaining rings of this type is that, prior to its initial insertion, the ring is straight and it only becomes curved after it has been installed. The important point to be noted with respect to Fig. 6 is that hook 6 can be inserted into or removed from notch 11 from any convenient angle or, in other words, from any angle that is permitted by the bevel of the sidewalls of feed slot 17, and the reason that the hook can be inserted from such a wide angle is because the hook has no dimension which is greater than $2d$ while, as has been previously set forth, the length or, in other words, the distance between the sidewalls of notch 11 is equal to $2d$. As a result, it will be apparent that any bending forces caused by attempting to remove the hook by pulling up on the body of the ring will be eliminated so that an important breakage factor is removed.

Figure 7:
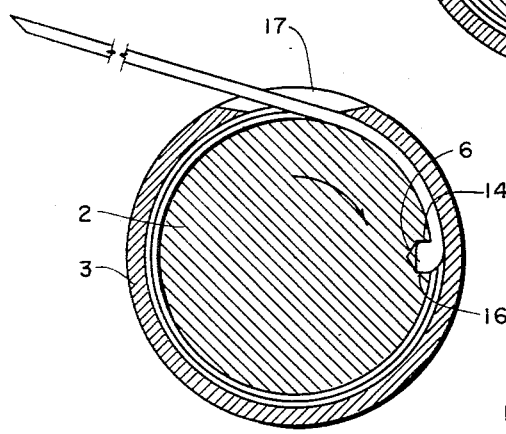

Fig. 7 illustrates the feeding of the ring into its groove or path and it is to be noted that hook 6 is anchored in its notch so that rotation of cylinder head 2 in a clockwise direction pulls the ring into its groove. During this phase of the assembly, straight side walls 14 and 16 of the hook firmly engage the sidewalls of the notch and assist in preventing the hook from bending backwardly or forwardly, and breaking off.

Figure 8:
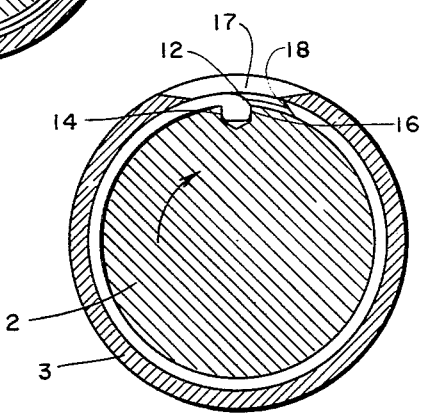
Figure 9:
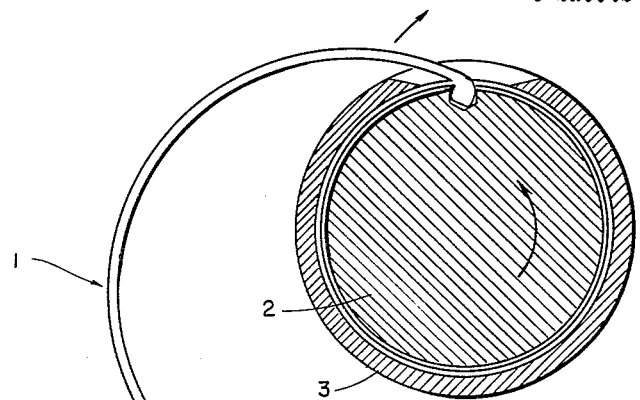

Fig. 8 shows the ring entirely fed into its path and, when in this position, the cylinder head 2 may be turned clockwise to any desired position such as might be required for orienting pipe ports or the like. Another point to be stressed is that during any subsequent clockwise rotation of the cylinder head the radius of curvature of edge 12 is such as enables this edge to cam itself beneath corner 18 of feed slot 17 so as to permit the hook end of the ring to pass freely under this point. This particular feature is of some impotrance since, as has been indicated previously, the material from which these rings are made has such a springiness as to produce a tendency for the hook end to spring outwardly and possibly jam against corner 18. Such a tendency not only is offset by the radius of curvature of edge 12 but it further is to be noted that straight walls 14 and 16 remain firmly engaged with the sidewalls of the notch so as to resist any such spring effect. Most suitably, the material from which the ring is made also is chosen to minimize the spring effect or, stated more technically, the material used is one which has a low yield point and, preferably, a high modules of elasticity. One material that has been found satisfactory is annealed No. 1010 steel.

Fig. 9 illustrates the manner in which the ring can be removed from feed slot 17. Of course, the initial step in removing the ring is to free the trailing end of the ring, although this is accomplished in a particular manner which will be described later with reference to Figs. 10 and 11. With the trailing end freed, inner cylinder 2 is rotated in a counter-clockwise manner until hook 6 lies directly beneath the feed slot. At this time, the ring can be lifted out of its notch without producing any bending movement such as eventually leads to breakage. In fact, because the hook has no dimension which exceeds 2d (such being the length of the notch) the ring itself is capable of being swung upwardly in the direction of the arrow show in Fig. 9, and, when so swung, the hook simply rocks in its notch on its rounded edges. The point that is being emphasized is the fact that, were it not for these rounded edges, any such attempt to swing the ring would produce a serious and probably a fatal bending moment. As would be expected, when there is no such free rocking movement available, extreme care must be exercised so as to avoid these bending forces. Another consideration is that, when no such rocking motion is permitted, unless the hook is lifted in a perpendicular direction out of its slot, there will be an undesirable bending force created. Thus, when rocking is not permitted, the angle at which the ring can be lifted out of its slot without producing such bending force is extremely limited.

In view of the above considerations, it now should be apparent that the fatal bending force is avoided not only during removal of the ring from its feed slot but also during its insertion into the slot. The relatively wide angle at which the ring can lie when the hook is inserted or removed is not only a matter of great convenience, it is a factor which minimizes the breakage. In addition to these advantages, the straight side walls of the hook act to firmly anchor the hook in its notch and prevent accidental detachment produced by the springiness of the material while the hook is passing the open feed slot. Finally, such accidental detachment also is further offset by the camming action produced by arcuate edge 12.

Figure 10:
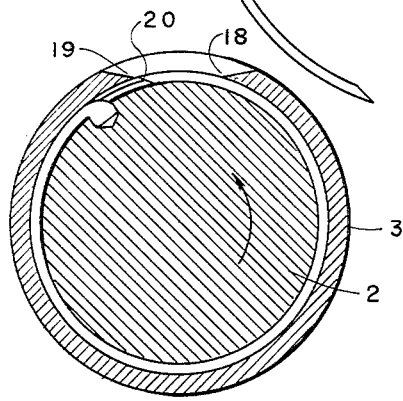
Figure 11:
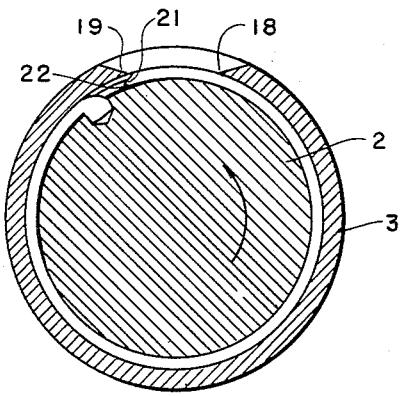

Figs. 10 and 11 illustrate the different functioning of the modifications shown in Figs. 2 and 4. Thus, as may be noted in Fig. 2, trailing end 20 of body portion 4 of the ring is provided with approximately a 30° inwardly-directed bevel and, as may be noted in Fig. 10, the bevel is such as to cause the trailing end to catch on corner 19 when cylinder 2 is rotated in a counter-clockwise direction. Thus, this particular modification facilitates extraction of the ring and is useful when frequent disassembly is anticipated or when there is little need for rotation of inner cylinder 2.

In contrast, the modification illustrated in Fig. 4 has a V-shape trailing edge in which upper or outer leg 21 of the V has a 30° bevel opposite to or reverse from the bevel of the Fig. 2 modification. However, leg 22 of the V also is provided with a 30° inward bevel which extends in the same direction as the beveled end of the Fig. 2 modification. Such a modification as illustrated in Fig. 4 can therefore be considered as a "shake-proof" model which is useful in situations where accidental freeing of the trailing end should be carefully avoided. As may be noted in Fig. 11, leg 21 of the V is beveled in such a manner that counter-clockwise rotation of cylinder 2 causes the trailing edge to cam itself beneath corner 19 of feed slot 17. For this reason, any amount of rotation of inner cylinder 2 should not normally result in accidental release. However, when it is desired to remove the ring from its feed slot, it is necessary only to insert a thin metal tool under leg 22 for the purpose of prying the trailing end upwardly an amount sufficient to cause leg 22 to catch above corner 19.

It now should be apparent that the present invention provides not only an internal retaining ring which has a hook portion capable of retaining itself during rotation but, in addition, capable of preventing accidental release. At the same time, as has been fully developed, the hook portion of the ring is of such a configuration as to substantially minimize the breakage which has presented a real problem in the more conventional types of rings.

Obviously many modifications and variations of the present invention are possible in the light of the above teachings. It is therefore to be understood that within the scope of the appended claim the invention may be practiced otherwise than as specifically described.

What is claimed is:

A retaining ring for keying-together concentrically-arranged inner and outer cylindrical members each of which is provided with a groove adapted upon mutual alignment to form a path into which said ring is wound, the ring being engageable in a straight-sided notch formed in said path whereby the ring can be wound into the path; said ring comprising an elongate flexible body, and a detent projecting outwardly from one end of the body, the outermost upper edge of the detent end of said body being rounded and the inner bottom edge of said detent diametrically opposite said upper edge also being rounded, said detent having its leading and trailing side walls provided with substantially straight-surfaced portions adapted to engage the straight-sided notch for anchoring the detent when said ring is wound into said path, and the maximum diametrical distance between said rounded edges being no greater than the base of the notch whereby said detent is rockable in said notch.

References Cited in the file of this patent

UNITED STATES PATENTS

| | | |
|---|---|---|
| 1,464,386 | Ingram | Aug. 7, 1923 |

FOREIGN PATENTS

| | | |
|---|---|---|
| 261,373 | Germany | June 20, 1913 |
| 145,116 | Germany | Oct. 31, 1903 |
| 504,103 | Belgium | July 14, 1951 |